United States Patent [19]

Kejha

[11] Patent Number: 5,750,289
[45] Date of Patent: May 12, 1998

[54] LIGHTWEIGHT CURRENT COLLECTORS AND CARRIERS

[76] Inventor: Joseph B. Kejha, Lithium Technology Corporation, 5115 Campus Dr., Plymouth Mtg., Pa. 19462-1129

[21] Appl. No.: 724,862

[22] Filed: Oct. 3, 1996

Related U.S. Application Data

[63] Continuation-in-part of Ser. No. 281,011, Jul. 27, 1994, abandoned.

[51] Int. Cl.⁶ .................................................... H01M 4/64
[52] U.S. Cl. .......................... 429/233; 429/241; 429/242; 429/245
[58] Field of Search ............................ 29/623.1–623.5; 429/233, 241, 242, 245, 122, 218

[56] References Cited

U.S. PATENT DOCUMENTS

| 5,521,023 | 5/1996 | Kejha et al. ..................... 429/142 |
| 5,605,550 | 2/1997 | Jensen et al. ..................... 29/623.3 |

FOREIGN PATENT DOCUMENTS 5539180  3/1990  Japan.

Primary Examiner—Bruce F. Bell
Attorney, Agent, or Firm—Zachary T. Wobensmith, III

[57] ABSTRACT

Lightweight current collectors and carriers for incorporation into at least one of the electrodes which are used in alkali-metal polymer electrolyte electrochemical devices, which current collectors and carriers are of expanded metallized plastic film.

23 Claims, 1 Drawing Sheet

LIGHTWEIGHT CURRENT COLLECTORS AND CARRIERS

CROSS REFERENCE TO RELATED APPLICATIONS

This application is a continuation in part of my prior application Ser. No. 08/281,011 filed Jul. 27, 1994, now abandoned entitled: LIGHTWEIGHT CURRENT COLLECTORS AND CARRIERS

BACKGROUND OF THE INVENTION

1. Field of the Invention

This invention is directed to lightweight current collectors and carriers for use in electrodes of electrochemical devices which are formed of an expanded or perforated plastic film or sheet or woven or non-woven plastic fiber mesh or net with a metallic coating thereon.

2. Description of the Prior Art

Electrochemical devices such as electric batteries of the solid state type consist of at least an anode, a layer of electrolyte, and a cathode. The batteries require a base current collector and carrier for both the anode and the cathode. Various materials have been proposed for use as the base current collector and carrier, but none of them are entirely satisfactory.

In the U.S. Patents to Hope et al., U.S. Pat. Nos. 4,794,059; 4,861,690; and 4,960,655 carbon fiber and graphite material in the form of a solid ribbon, or a woven or non-woven mesh are described which are used as base current collectors and carriers. While graphite and carbon in solid ribbon or mesh form are satisfactory for their intended purpose, the carbon fiber non-woven fabric is usually of 3 mils thickness, is bulky, is heavier than polyethylene and other plastics, and also costs more than is optimal. Since the base current collector and carrier often account for as much as 50% (percent) of total battery weight, a reduction in the weight is desirable and will also increase the energy density of the battery.

In the Japanese Patent No. 58-61566(a) a production method for a lead storage battery is described where a lattice structure of synthetic resin with a cross-section of circular shape is immersed in melted lead so as to form a thin lead film on the surface of the lattice structure. The disclosed resin material is polypropylene, this structure is restricted to lead batteries, and would not be suitable for use in other electrochemical devices as described by applicant.

In the Japanese patent No. JA-7303501-R an electrode grid for lead accumulators is described which comprise a plastic film with holes, that has been coated by vacuum and electroplating of lead on the plastic film. This structure is only useful with lead batteries, and not suitable for other electrochemical devices as described by applicant.

In the Japanese Patent No. 55-39180(A) a method of production for the electrode base of a cell is described. A porous member such as felt or unwoven cloth of polypropylene, or polyethylene is immersed in a binder solution that contains conductive powder such as nickel, iron, or carbon powder. The porous member is dried and non-electrolyte and electronic galvanization with nickel are performed to obtain a nickel layer on the member. This does not suggest the structure as described by applicant. The whole Japanese patent structure including powder is metallized after coating, while applicant only metallizes the fibers.

In the German patent No. DT 2721560 expanded metal grids used as lead accumulator plates are described The grids are made from a strip of stiff lead-antimony alloy or plastic resistant to $H_2SO_4$, which is coated on one or both sides with a rolled sheet or strip of lead-antimony, which is then made into expanded metal in the conventional manner. This structure is not suitable for use in other than lead acid batteries, and does not suggest applicant's structure which is used in other than lead acid batteries.

In the U.S. Patent to Drews et al., U.S. Pat. No. 5,139,902, an electrode is described which comprises a grid plate which serves as the carrier for battery active material and for current supply and return. The grid plate includes woven plastic threads which are rendered electrically conductive by coating with a conductive layer of metal, and additionally metallized by coating with at least one coating of a lead-tin alloy or lead alone. The grid plate is further divided into two dimensional zones for storage of the active material, and current conducting zones for current supply and return. This plate which is described as having a thickness of 4 mils to ⅛ inch is useful only for lead acid batteries, and does not suggest the structures described by applicant.

In the U.S. Patent to King et al., U.S. Pat. No. 4,129,692 an electrode structure for an electrochemical cell in lead acid batteries is described, which is a fibrous support of organic polymeric material of a thickness of 0.1 to 3 mm, which has a pattern of solid conductors thereon, which extend over the surface of the porous support from current take-off regions to spaced regions, with electrochemically active material deposited on the fibrous material which has had metal deposited thereon or wires to provide the electrical conductors. This structure is much thicker than applicant, who uses up to 3 mils thickness. In addition, the King et al. structure is intended for use with lead acid batteries, and would not be suitable for the structures described by applicant.

Examples of other pertinent prior art structures are shown and described in the U.S. Patents to Balanger, U.S. Pat. No. 3,485,677; Rippel et al., U.S. Pat. No. 4,275,130; Basu, U.S. Pat. No. 4,304,825; Bannister, U.S. Pat. No. 4,471,037; Suguichi et al., U.S. Pat. No. 4,496,638; Murray, U.S. Pat. No. 4,497,883; Skotheim, U.S. Pat. No. 4,520,086; Hope et al., U.S. Pat. No. 4,576,883;; and in the article by Hooper et al. titled "Advanced Battery Development" published by Odense University Press, 1984.

The described electrochemical devices for which base current collectors and carriers are described and for which the present collectors are useful include alkali metal batteries, nickel metal hydride batteries, nickel cadmium, lithium-ion, nickel-hydrogen, zinc-air batteries, capacitors and fuel cells.

SUMMARY OF THE INVENTION

It has now been found that the use of a lightweight expanded metallized plastic film or perforated metallized plastic film or metallized plastic fibers in woven or non-woven-mesh or net for current collectors and carriers in electrodes for electrochemical devices provides a lightweight structure, with a long shelf and operating life, increases energy density, reduces the cost and weight considerably, is suitable for mass production and provides numerous other benefits.

The principal object of the invention is to provide lightweight current collectors and carriers for electrodes in electrochemical devices which are strong, lightweight, and which are not reactive with the components of the electrochemical devices.

A further object of the invention is to provide lightweight current collectors and carriers that are suitable for mass production.

A further object of the invention is to provide lightweight current collectors and carriers that are simple and inexpensive to construct.

A further object of the invention is to provide lightweight current collectors and carriers that are useful with a wide variety of electrochemical devices.

A further object of the invention is to provide lightweight current collectors and carriers which help to improve the energy density of the electrochemical devices into which they are incorporated.

A further object of the invention is to provide lightweight current collectors and carriers which can be used in electrodes.

Other objects and advantageous features of the invention will be apparent from the description and claims.

BRIEF DESCRIPTION OF THE DRAWINGS

The nature and characteristic features of the invention will be more readily understood from the following description taken ion connection with the accompanying drawings forming part hereof in which.

It should, of course, be understood that the description and drawings herein are merely illustrative and that various modifications and changes can be made in the structures disclosed without departing from the spirit of the invention.

DESCRIPTION OF THE PREFERRED EMBODIMENTS

Figure 1:
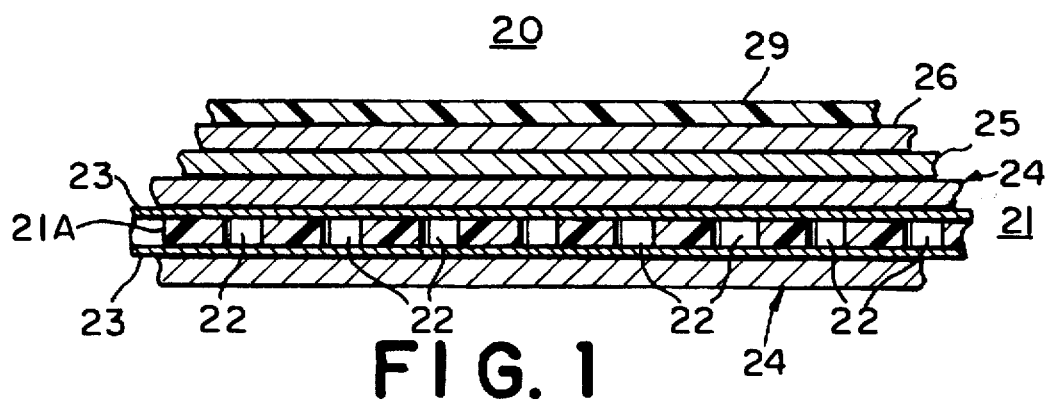
FIG. 1 is a diagrammatic view of one embodiment of a lightweight base current collector and carrier for an alkali metal battery.

Referring now more particularly to the drawings thereof and FIG. 1, a typical alkali metal-polymer battery 20 is illustrated which incorporates the base current collector and carrier of the invention.

Alkali metal-polymer batteries such as alkaline metal or alkaline earth metal-polymer batteries, and for example lithium-polymer batteries, consist of at least an anode or negative electrode, a polymer ion-conductive layer, and a cathode or positive electrode. Such batteries can be of virtually any desired size and configuration, and usually include additional layers such as current conducting backing layers, insulating layers and connection layers. In batteries with liquid electrolytes, the polymer is replaced by a porous membrane with liquid electrolyte.

For purposes of illustration, the battery 20 to be described is of the lithium metal type, but other alkaline metals or alkaline earth metals can be used if desired. The battery 20 includes a base 21 which acts as a current collector and carrier for the battery.

The base 21 as illustrated includes a ribbon 21A of expanded or perforated plastic such as film and which is preferably formed of a ribbon of polypropylene, polyethylene, ethylenetetrafluoroethylene, polyester, polytetrafluor-ethylene or polyvinylchloride plastic and their variations with a plurality of holes 22 therethrough.

The ribbon 21A is coated by any well known method for metallizing plastic films such as vacuum deposition or electroless metal plating, which coating 23 is of metal, which is selected to be compatible with the battery chemistry and components. The coating 23 may be on one or both sides of, or may completely encapsulate, the ribbon 21A. The coating 23 supports the specific current collecting and carrying capabilities as required by the device in which it is incorporated.

The coating 23 does not close the holes 22 which holes can take up to approximately 90% (percent) of the surface are of the ribbon 21A.

The ribbon 21A can be of a thickness of ¼ mil which is 1/12 of the thickness of an equivalent carbon fiber based ribbon (not shown).

If the base current collector and carrier 21 with coating 23 is to be used for a cathode, then it may be coated by additional layers 24 of cathodic composition of well known type, which may have finely ground particles of an intercalation compound such as vanadium oxide compound $V_6O_{13}$ mixed with an organic solvent, polymer, alkali salt, and carbon black.

The resultant cathode has the base current collector 21 embedded in the described composition matrix. Additional layers may be applied to form the complete device. The layer 24 may have a layer 25 of polymeric electrolyte applied thereto which may be a thin layer of polyethylene oxide compounded with a lithium salt.

Figure 2:
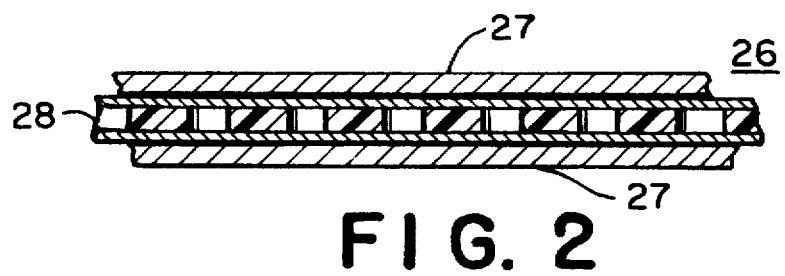
FIG. 2 is a diagrammatic view of a carbon anode incorporating another construction of lightweight base current collector and carrier for an alkali metal-ion battery.

The layer 25 may have an anodic layer 26 applied thereto which may be an alkali metal foil or alkali metal alloy foil, or a lithiated carbon compound 27 coated on another metallized expanded or perforated plastic film 28 as shown in FIG. 2.

Layer 26 in FIG. 1 may optionally have a metallized expanded or perforated plastic film 29 added on top thereto as a current collector. If only one side of film 29 is metallized, then the metallized side should face layer 26.

It should be noted that the grid 21, ribbon 21A and films 28, 29 can be replaced by a metallized plastic fiber mesh or net (not shown) which is woven or non-woven. The plastic fiber material may be the same material as described for the film and sheets, and may be metallized on one or both sides.

For other types of batteries, capacitors or fuel cells, appropriate chemistry layers may be applied on described current collectors/carriers. It should be noted that capacitors include a dielectric layer between electrodes.

It will thus be seen that structures have been provided with which the objects of the invention are achieved.

I claim:

1. An assembly wherein a current collector and carrier is included in at least one of the electrodes of an alkali metal polymer electrolyte electrochemical device, which device includes a negative electrode, a polymer ion conductive layer, and a positive electrode, wherein the current collector and carrier consists of
   a ribbon of expanded metallized plastic, with the metal selected from the group consisting of nickel, copper, aluminum, and chrome.

2. An assembly wherein a current collector and carrier is included in at least one of the electrodes of an alkali metal electrochemical device, which device includes a negative electrode, a polymer ion conductive porous membrane with liquid electrolyte therein, and a positive electrode, wherein the current collector and carrier consists of
   a ribbon of expanded metallized plastic, with the metal selected from the group consisting of nickel, copper, aluminum, and chrome.

3. An assembly wherein a current collector and carrier is included in at least one of the electrodes of an alkali metal polymer electrolyte electrochemical device, which device includes a negative electrode, a dielectric layer, and a positive electrode, wherein the current collector and carrier consists of a ribbon of expanded metallized plastic, with the metal selected from the group consisting of nickel, copper, aluminum, and chrome.

4. An assembly wherein a current collector and carrier is included in at least one of the electrodes of an alkali metal polymer electrolyte electrochemical device, which device includes a negative electrode, a polymer ion conductive layer, and a positive electrode, wherein the current collector and carrier consists of a ribbon of perforated metallized plastic, with the metal selected from the group consisting of nickel, copper, aluminum, and chrome.

5. An assembly wherein a current collector and carrier is included in at least one of the electrodes of an alkali metal electrochemical device, which device includes a negative electrode, a polymer, ion conductive porous membrane with liquid electrolyte therein, and a positive electrode, wherein the current collector and carrier consists of a ribbon of perforated metallized plastic, with the metal selected from the group consisting of nickel, copper, aluminum, and chrome.

6. An assembly wherein a current collector and carrier is included in at least one of the electrodes of an alkali metal polymer electrolyte electrochemical device, which device includes a negative electrode, a dielectric layer, and a positive electrode, wherein the current collector and carrier consists of a ribbon of perforated metallized plastic, with the metal selected from the group consisting of nickel, copper, aluminum, and chrome.

7. A current collector and carrier, as defined in claims 1, 2, 3, 4, 5, or 6 in which said plastic is a film.

8. A current collector and carrier, as defined in claims 1, 2, 3, 4, or 6 in which said plastic is a sheet.

9. An assembly wherein a current collector and carrier is included in at least one of the electrodes of an alkali metal polymer electrolyte electrochemical device, which device includes a negative electrode, a polymer ion conductive layer, and a positive electrode wherein the current collector and carrier consists of a ribbon of woven metallized plastic fiber mesh or net, with the metal selected from the group consisting of nickel, copper, aluminum, and chrome.

10. An assembly wherein a current collector and carrier is included in at least one of the electrodes of an alkali metal polymer electrolyte electrochemical device, which device includes a negative electrode, a polymer ion conductive layer, and a positive electrode, wherein the current collector and carrier consists of a ribbon of non-woven metallized plastic fiber mesh or net, with the metal selected from the group consisting of nickel, copper, aluminum, and chrome.

11. An assembly wherein a current collector and carrier is included in at least one of the electrodes of an alkali metal electrochemical device, which device includes a negative electrode, a polymer ion conductive porous membrane with liquid electrolyte therein, and a positive electrode, wherein the current collector and carrier consists of a ribbon of non-woven metallized plastic fiber mesh or net, with the metal selected from the group consisting of nickel, copper, aluminum, and chrome.

12. An assembly wherein a current collector and carrier is included in at least one of the electrodes of an alkali metal electrochemical device, which device includes a negative electrode, a polymer ion conductive porous membrane with liquid electrolyte therein, and a positive electrode, wherein the current collector and carrier consists of a ribbon of woven metallized plastic fiber mesh or net, with the metal selected from the group consisting of nickel, copper, aluminum, and chrome.

13. A current collector and carrier, as defined in claims 1, 2, 4, 5, 9, 10, 11, or 12 in which said negative electrode additionally includes a carbon material.

14. A current collector and carrier, as defined in claims 1, 2, 4, 5, 9, 10, 11, or 12 in which said positive electrode additionally includes a cathode active material.

15. An assembly wherein a current collector and carrier is included in at least one of the electrodes of an alkali metal polymer electrolyte electrochemical device, which device includes a negative electrode, a dielectric layer, and a positive electrode, wherein the current collector and carrier consists of a ribbon of woven metallized plastic fiber mesh or net, with the metal selected from the group consisting of nickel, copper, aluminum, and chrome.

16. An assembly wherein a current collector and carrier is included in at least one of the electrodes of an alkali metal polymer electrolyte electrochemical device, which device includes a negative electrode, a dielectric layer, and a positive electrode, wherein the current collector and carrier consists of a ribbon of non-woven metallized plastic fiber mesh or net, with the metal selected from the group consisting of nickel, copper, aluminum, and chrome.

17. A current collector and carrier, as defined in claims 1, 2, 3, 4, 5, 6, 9, 10, 11, 12, 15, or 16 in which said plastic is polypropylene.

18. A current collector and carrier, as defined in claims 1, 2, 3, 4, 5, 6, 9, 10, 11, 12, 15, or 16 in which said plastic is polyethylene.

19. A current collector and carrier, as defined in claims 1, 2, 3, 4, 5, 6, 9, 10, 11, 12, 15, or 16 in which said plastic is polyester.

20. A current collector and carrier, as defined in claims 1, 2, 3, 4, 5, 6, 9, 10, 11, 12, 15, or 16 in which said plastic is ethylenetetrafluoroethylene.

21. A current collector and carrier, as defined in claims 1, 2, 3, 4, 5, 6, 9, 10, 11, 12, 15, or 16 in which said plastic is polytetrafluoroethylene.

22. A current collector and carrier, as defined in claims 1, 2, 3, 4, 5, 6, 9, 10, 11, 12, 15, or 16 in which said plastic is polyvinylchloride.

23. A current collector and carrier, as defined in claims 1, 2, 3, 4, 5, 6, 9, 10, 11, 12, 15, or 16 in which said plastic is metallized on one side.

* * * * *